(12) United States Patent
Wolff et al.

(10) Patent No.: US 12,521,195 B2
(45) Date of Patent: Jan. 13, 2026

(54) ROBOTIC SURGICAL SYSTEMS

(71) Applicant: Covidien LP, Mansfield, MA (US)

(72) Inventors: Reiner Wolff, Inning (DE); Ulrich Hagn, Munich (DE)

(73) Assignee: Covidien LP, Mansfield, MA (US)

( * ) Notice: Subject to any disclaimer, the term of this patent is extended or adjusted under 35 U.S.C. 154(b) by 520 days.

(21) Appl. No.: 17/766,305

(22) PCT Filed: Nov. 19, 2020

(86) PCT No.: PCT/IB2020/060921
§ 371 (c)(1),
(2) Date: Apr. 4, 2022

(87) PCT Pub. No.: WO2021/105827
PCT Pub. Date: Jun. 3, 2021

(65) Prior Publication Data
US 2024/0050177 A1 Feb. 15, 2024

Related U.S. Application Data

(60) Provisional application No. 62/939,952, filed on Nov. 25, 2019.

(51) Int. Cl.
*B25J 9/18* (2006.01)
*A61B 17/08* (2006.01)
(Continued)

(52) U.S. Cl.
CPC .............. *A61B 34/37* (2016.02); *A61B 17/08* (2013.01); *A61B 34/74* (2016.02); *A61B 2017/00477* (2013.01); *A61B 2034/305* (2016.02)

(58) Field of Classification Search
CPC .......... A61B 24/27; A61B 34/74; A61B 17/08
(Continued)

(56) References Cited

U.S. PATENT DOCUMENTS

| 7,035,716 B2* | 4/2006 | Harris ..................... A61B 34/76 600/102 |
| 2007/0137371 A1 | 6/2007 | Devengenzo et al. |
| 2008/0001559 A1* | 1/2008 | Schena ................ G11B 15/605 318/68 |

(Continued)

FOREIGN PATENT DOCUMENTS

| CN | 109152609 A | 1/2019 |
| CN | 109715104 A | 5/2019 |

(Continued)

OTHER PUBLICATIONS

International Search Report and Written Opinion dated Mar. 1, 2021, issued in corresponding international application No. PCT/IB2020/060921, 11 pages.

(Continued)

*Primary Examiner* — Erick D Glass
(74) *Attorney, Agent, or Firm* — Carter, DeLuca & Farrel (57) ABSTRACT

A robotic surgical system includes a carrier for axially moving an instrument drive unit and an attached surgical instrument. A release mechanism is coupled to the carrier and a slide rail and transitions between a first state, in which the carrier and instrument drive unit are fixed relative to the release mechanism, and a second state, in which the carrier and instrument drive unit are manually movable relative to a slide rail.

17 Claims, 8 Drawing Sheets

(51) Int. Cl.
*A61B 34/00* (2016.01)
*A61B 34/37* (2016.01)
*A61B 17/00* (2006.01)
*A61B 34/30* (2016.01)

(58) Field of Classification Search
USPC .................................................. 318/568.11
See application file for complete search history.

(56) References Cited

U.S. PATENT DOCUMENTS

| | | |
|---|---|---|
| 2016/0235490 A1 | 8/2016 | Srivastava et al. |
| 2019/0231447 A1* | 8/2019 | Ebbitt ........................ A61F 2/46 |
| 2020/0222079 A1* | 7/2020 | Swaney ................. A61B 34/30 |
| 2021/0169591 A1* | 6/2021 | Kapadia ................ A61B 34/30 |

FOREIGN PATENT DOCUMENTS

| | | |
|---|---|---|
| EP | 3826566 A1 | 6/2021 |
| WO | 2019139941 A1 | 7/2019 |
| WO | 2019204000 A1 | 10/2019 |
| WO | 2020023255 A1 | 1/2020 |

OTHER PUBLICATIONS

Chinese Office Action issued in corresponding Chinese Application No. 202080079697 issued Dec. 31, 2024, 20 pages.

Communication Pursuant to Article 94(3) EPC issued in corresponding European Application No. 20 821 383.5 dated Sep. 16, 2025, 9 pages.

* cited by examiner

ROBOTIC SURGICAL SYSTEMS

CROSS-REFERENCE TO RELATED APPLICATION

This application is a national stage of International Application No. PCT/IB2020/060921, filed Nov. 19, 2020, which claims the benefit of and priority to U.S. Provisional Application No. 62/939,952, filed Nov. 25, 2019, the entire disclosures of each of which are incorporated by reference herein.

TECHNICAL FIELD

The disclosure relates to robotics, and more specifically to robotic surgical devices, assemblies, and/or systems for performing endoscopic surgical procedures and methods of use thereof.

BACKGROUND

Robotic surgical systems have been used in minimally invasive medical procedures. Some robotic surgical systems include a console linked to a surgical robotic arm and a surgical instrument mounted to the robotic arm. The surgical instrument may have an elongated shaft that supports at least one end effector (e.g., forceps or a grasping tool) on a distal end thereof. In some robotic surgical systems, the entire length of the elongated shaft of the surgical instrument must pass through a holder or other feature of the robotic arm, thereby making removal or exchange of the surgical instrument from the robotic arm cumbersome.

Manually-operated surgical instruments often include a handle assembly for actuating the functions of the surgical instrument; however, when using a robotic surgical system, no handle assembly is typically present to actuate the functions of the end effector. It is the robotic arm of the robotic surgical system that provides mechanical power to the surgical instrument for its operation and movement. Each robotic arm may include an instrument drive unit that is operatively connected to the surgical instrument and slidably coupled to the robotic arm.

SUMMARY

In accordance with an aspect of the disclosure, a robotic surgical system is provided and includes a slide rail configured to be coupled to a robotic arm, a drive member movably coupled to the slide rail, a carrier coupled to the slide rail and configured to slide along a longitudinal axis of the slide rail in response to movement of the drive member, and a release mechanism fixed to the drive member, such that the release mechanism moves with the drive member relative to the slide rail. The release mechanism is configured to have a first state, in which the release mechanism couples the carrier to the drive member, and a second state, in which the release mechanism decouples the carrier from the drive member. When the release mechanism is in the second state, the carrier is manually movable relative to the drive member.

In some aspects, the robotic surgical system may further include an instrument drive unit configured to be slidably coupled to the slide rail and fixed to the carrier. The instrument drive unit may be configured to effect functions of an attached surgical instrument.

In some aspects, the drive member may be a belt that travels along the longitudinal axis of the slide rail to effect axial motion of the carrier when the release mechanism is in the first state.

In some aspects, the release mechanism may include a clamp fixed to the drive member, and a lever coupled to the clamp. The lever may be configured to rotate relative to the clamp to selectively couple and decouple the release mechanism to and from the carrier.

In some aspects, the carrier may have a locking member, and the release mechanism may have a locking member attached to the lever. The locking member of the release mechanism may be configured to rotate with the lever and relative to the locking member of the carrier to selectively lockingly engage with the locking member of the carrier.

In some aspects, the locking member of the carrier may define a cutout therein. The locking member of the release mechanism may engage the cutout of the locking member of the carrier when the release mechanism is in the first state to transmit axial motion between the carrier and the release mechanism.

In some aspects, the cutout of the locking member of the carrier may permit the locking member of the release mechanism to rotate therewithin and resists axial motion of the locking member of the release mechanism relative to the locking member of the carrier.

In some aspects, the cutout of the locking member of the carrier may have a cylindrical configuration. The cutout of the locking member of the carrier may extend transversely relative to the longitudinal axis of the slide rail.

In some aspects, the locking member of the release mechanism may define a cutout. The cutout of the locking member of the release mechanism may be configured to be radially offset from the cutout of the locking member of the carrier when the release mechanism is in the first state, and to face the cutout of the locking member of the carrier when the release mechanism is in the second state.

In some aspects, the locking member of the release mechanism may have a convex portion configured for receipt in the cutout of the locking member of the release mechanism when the release mechanism is in the first state.

In some aspects, the locking member of the carrier may be rod-shaped, and the locking member of the release mechanism may be spherically-shaped.

In some aspects, the robotic surgical system may further include a spring element attached to the carrier and movable therewith. The slide rail may define a plurality of notches longitudinally spaced from one another along the longitudinal axis of the slide rail. The notches may be configured to resist distal movement of the spring element relative to the slide rail when the release mechanism is in the second state.

In some aspects, the spring element may be configured to move from a first position to a second position. In the first position, the spring element may be disengaged from the slide rail, and in the second position, the spring element may be engaged with the slide rail.

In some aspects, the spring element may have a proximal end secured to the carrier, and a distal end resiliently biased in a direction toward the slide rail.

In some aspects, the distal end of the spring element may be supported by the release mechanism to maintain the spring element in the first position. The distal end of the spring element may be configured to pivot into engagement with the slide rail upon the carrier moving proximally relative to the release mechanism.

In some aspects, each notch may be defined by a proximally-facing wall and a ramped surface extending proximally from the proximally-facing wall. The proximally-facing wall may be configured to prevent the spring element and the carrier from moving distally after the release mechanism moves to the second state.

In accordance with another aspect of the disclosure, a robotic surgical system is provided and includes a carrier and a release mechanism configured to operably couple the carrier to a slide rail of a robotic arm. The carrier is configured to slidingly couple to the slide rail and to couple to an instrument drive unit. The release mechanism includes a clamp configured to fix the release mechanism to a drive member of the slide rail, and a lever pivotably coupled to the clamp. The lever is configured to move between a first state, in which the carrier is fixed relative to the release mechanism, and a second state, in which the carrier is axially movable relative to the release mechanism. When the release mechanism is in the second state, the carrier is manually movable relative to the slide rail.

Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description given below, serve to explain the principles of the disclosure, wherein.

DETAILED DESCRIPTION

Embodiments of the disclosure are described in detail with reference to the drawings, in which like reference numerals designate identical or corresponding elements in each of the several views. As used herein, the term "distal" refers to that portion of the robotic surgical system or component thereof that is closer to a patient, while the term "proximal" refers to that portion of the robotic surgical system or component thereof that is farther from the patient.

As used herein, the terms parallel and perpendicular are understood to include relative configurations that are substantially parallel and substantially perpendicular up to about + or −10 degrees from true parallel and true perpendicular.

As used herein, the term "clinician" refers to a doctor, nurse, or other care provider and may include support personnel. In the following description, well-known functions or construction are not described in detail to avoid obscuring the disclosure in unnecessary detail.

Throughout the disclosure, components of the robotic surgical system described herein may have two or more duplicates thereof. In the interest of brevity, only one of the duplicate components will be described in detail. It can be assumed that the duplicate components not described in detail have identical features and/or functions or substantially identical features and/or functions as its sister component.

The present disclosure is generally directed to a release mechanism for use, e.g., during an emergency situation, such as a power failure or a locked robotic joint. In such a situation, it is desirable to be able to manually remove the surgical instrument from the operative site within a patient's body. The release mechanism allows a clinician to manually disconnect the instrument drive unit and the attached surgical instrument from a drive mechanism that is responsible for translating the instrument drive unit/surgical instrument proximally or distally relative to the patient. Upon actuating the release mechanism, the clinician may safely manually slide the instrument drive unit/surgical instrument proximally out of the operative site. Further provided herein is a ratchet mechanism that prevents the instrument drive unit/surgical instrument from accidentally moving distally toward the patient after having actuated the release mechanism to disconnect the instrument drive unit/surgical instrument from the drivetrain.

Figure 1:
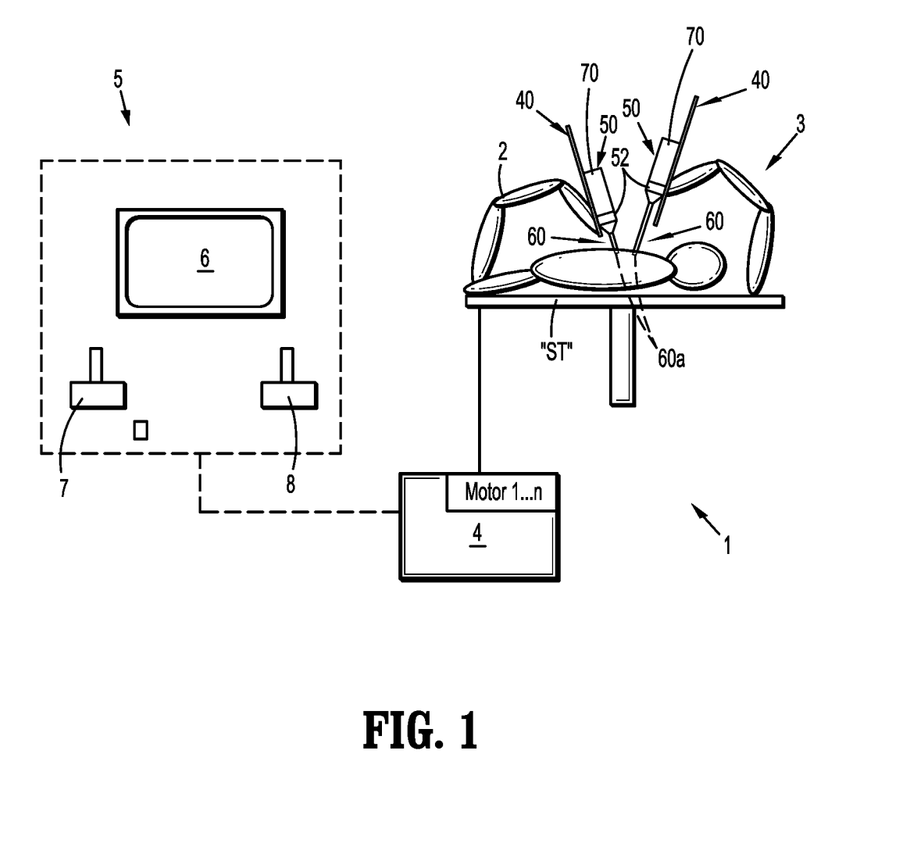
FIG. 1 is a schematic illustration of a robotic surgical system.
Figure 2:
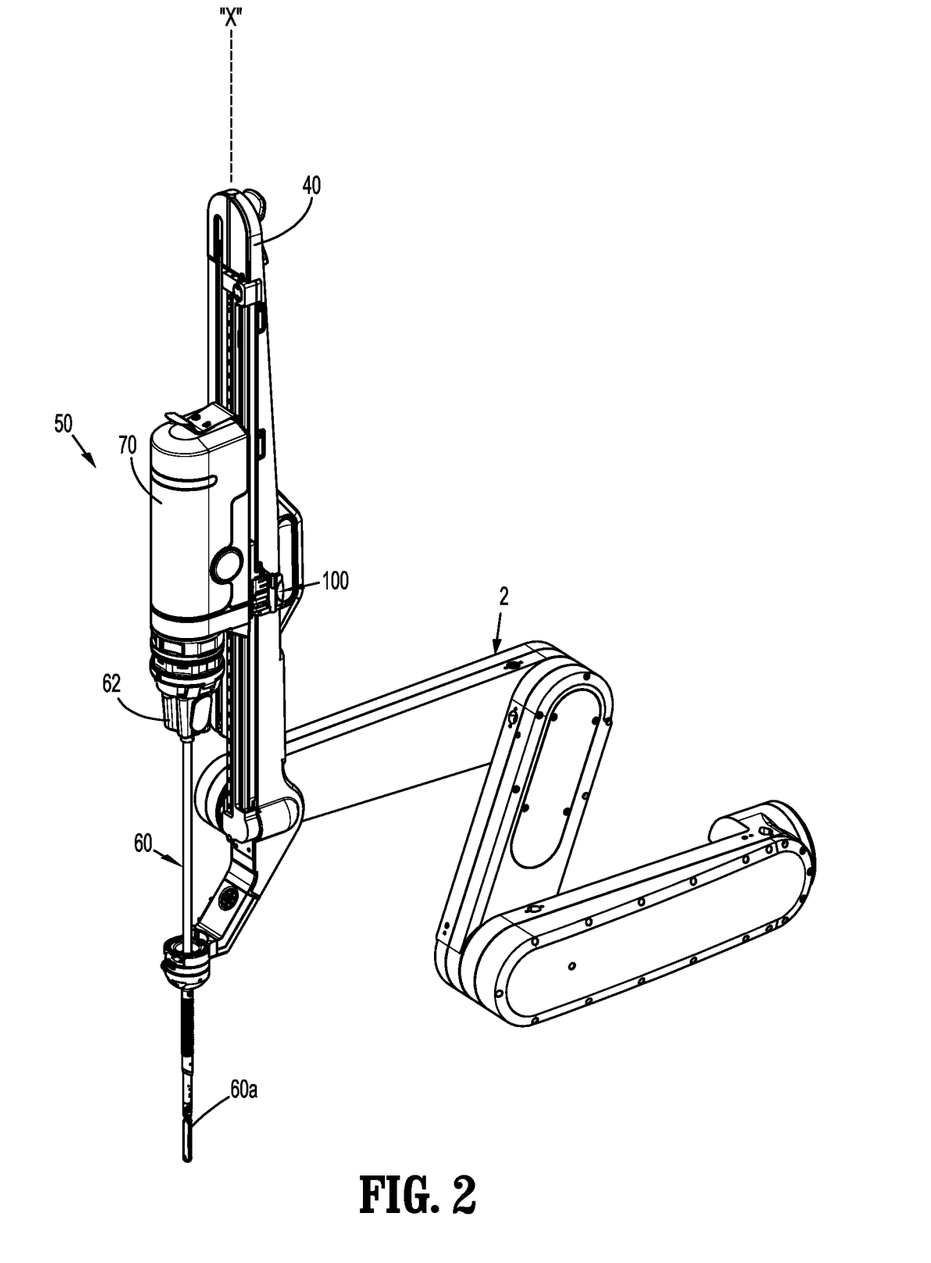
FIG. 2 is a side, perspective view illustrating components of the robotic surgical system of FIG. 1 including a robotic arm, a slide rail coupled to the robotic arm, and an instrument drive unit coupled to the slide rail.
Figure 3:
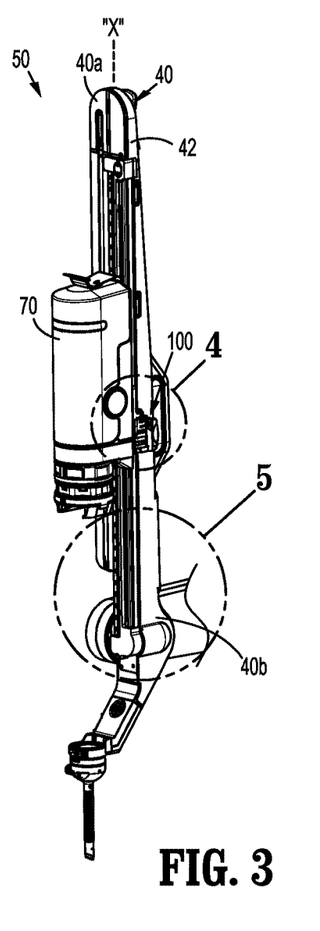
FIG. 3 is a perspective view illustrating the instrument drive unit, the slide rail, and a release mechanism of the robotic surgical system of FIG. 2.

Referring initially to FIGS. 1 and 2, a surgical system, such as, for example, a robotic surgical system 1, generally includes one or more surgical robotic arms 2, 3, a control device 4, and an operating console 5 coupled with control device 4. Any of the surgical robotic arms 2, 3 may have a robotic surgical assembly 50 coupled thereto. The robotic surgical assembly 50 includes an instrument drive unit 70 and a coupling assembly or sterile interface module 52 that couples an electromechanical surgical instrument 60 to the instrument drive unit 70. The robotic surgical assembly 50 is slidingly attached to a slide rail 40 of one of the surgical robotic arms 2, 3 to allow the surgical instrument 60 to translate along a longitudinal axis "X" (FIG. 2) defined by the slide rail 40.

The operating console 5 includes a display device 6, which is set up to display three-dimensional images. Manual input devices 7, 8, are provided that allow a clinician (not shown) to telemanipulate the robotic arms 2, 3 in a first operating mode, as known in principle to a person skilled in the art. Each of the robotic arms 2, 3 may be composed of any number of members, which may be connected through joints. The robotic arms 2, 3 may be driven by electric drives (not shown) that are connected to control device 4. The control device 4 (e.g., a computer) is set up to activate the drives, for example, by means of a computer program, in such a way that the robotic arms 2, 3, the attached robotic surgical assembly 50, and thus the electromechanical surgical instrument 60 (including an electromechanical end effector 60a thereof) execute a desired movement according to a movement defined by means of the manual input devices 7, 8. The control device 4 may also be set up in such a way that it regulates the movement of the robotic arms 2, 3 and/or of the drives.

The robotic surgical system 1 is configured for use on a patient positioned (e.g., lying) on a surgical table "ST" to be treated in a minimally invasive manner by means of a surgical instrument such as the electromechanical surgical instrument 60. The robotic surgical system 1 may also include more than two robotic arms 2, 3, the additional robotic arms likewise connected to the control device 4 and telemanipulatable by means of the operating console 5. A surgical instrument, for example, the electromechanical surgical instrument 60, may also be attached to any additional robotic arm(s).

The control device 4 may control one or more motors, e.g., motors (Motor 1 . . . n), each motor configured to drive movement of the robotic arms 2, 3 in any number of directions. Further, the control device 4 may control the instrument drive unit 70 including a motor assembly (not explicitly shown) thereof that drives various operations of the end effector 60a of the electromechanical surgical instrument 60.

The robotic surgical assembly 50 transfers power and actuation forces (e.g., torque) from the motors of the motor assembly of the instrument drive unit 70 to driven members (not explicitly shown) supported within an instrument housing 62 of the electromechanical surgical instrument 60. Such transfer of power and actuation forces ultimately drives movement of components of the end effector 60a of the electromechanical surgical instrument 60 for operating the electromechanical surgical instrument 60. This movement may include, for example, a movement of a knife blade (not shown) and/or a closing and opening of jaw members of the end effector 60a, an articulation/rotation/pitch/yaw of the end effector 60a, and/or the actuation or firing of the end effector 60a (e.g. a stapling portion of the end effector 60a).

With reference to FIGS. 3 and 5-8, the slide rail 40 of the robotic arm 2 has a housing 42 that houses a drivetrain 72 and a rail 44 that slidably supports a carrier 74 of the robotic surgical assembly 50. The drivetrain 72 is configured to drive a movement of the robotic surgical assembly 50 along the slide rail 40 and includes an actuator, such as, for example, a DC electric motor 76, a drive member 78 operably coupled to the motor 76, and a pair of proximal and distal pulleys 80a, 80b disposed on opposite proximal and distal ends 40a, 40b of the slide rail 40. The distal pulley 80b is drivingly coupled to the motor 76 and the proximal pulley 80a functions as an idler pulley. The drive member 78 may be a toothed belt wrapped about the proximal and distal pulleys 80a, 80b and is configured to move along the longitudinal axis "X" of the slide rail 40 in response to an actuation of the motor 76. In other aspects, instead of the drivetrain 72 being a pulley drive system, the drivetrain 72 may include a lead screw and a nut configured to travel along the longitudinal axis "X" of the slide rail 40 in response to an actuation of the motor 76.

The carrier 74 of the robotic surgical assembly 50 is selectively fixed to the belt 78 of the drivetrain 72, such that the carrier 74 moves with and by the belt 78 along the longitudinal axis "X" of the slide rail 40. The carrier 74 has a support plate 82 slidingly coupled to the longitudinal rail 44 of the slide rail 40. Surface features 84 (FIG. 8) project from the support plate 82 for mounting the instrument drive unit 70 to the carrier 74.

Figure 4:
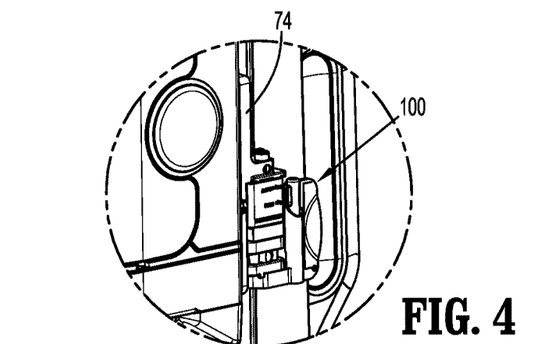
FIG. 4 is an enlarged view illustrating the area of detail labeled "4" in FIG. 3.
Figure 5:
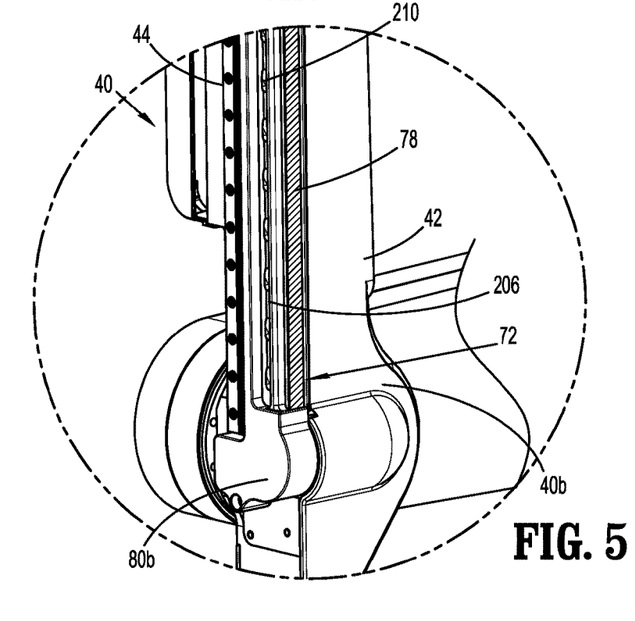
FIG. 5 is an enlarged view illustrating the area of detail labeled "5" in FIG. 3.
Figures 6, 7:
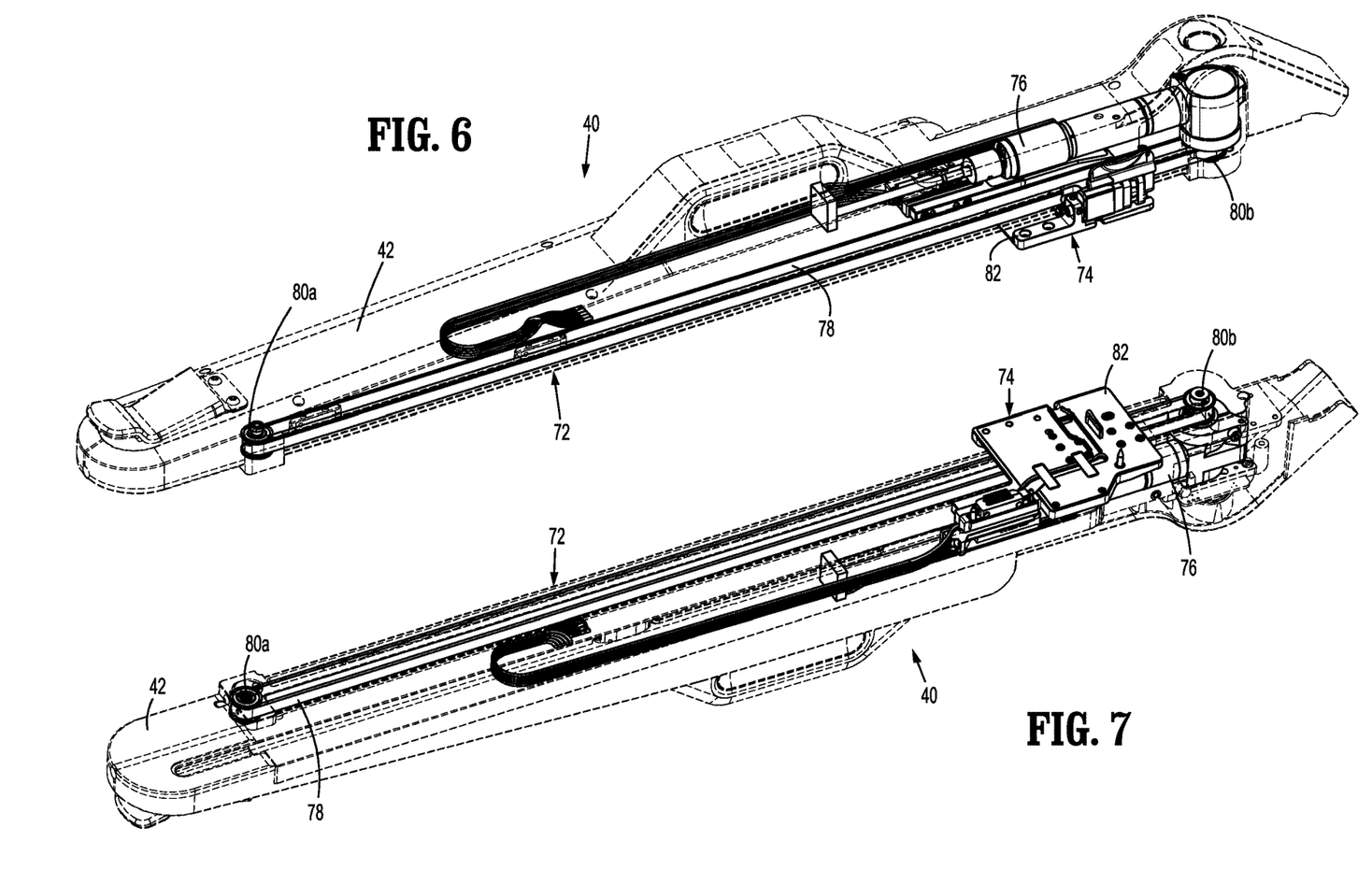
FIG. 6 is a rear, perspective view illustrating a drivetrain of the slide rail of FIG. 3.
FIG. 7 is front, perspective view illustrating the drivetrain of the slide rail of FIG. 3.
Figure 8:
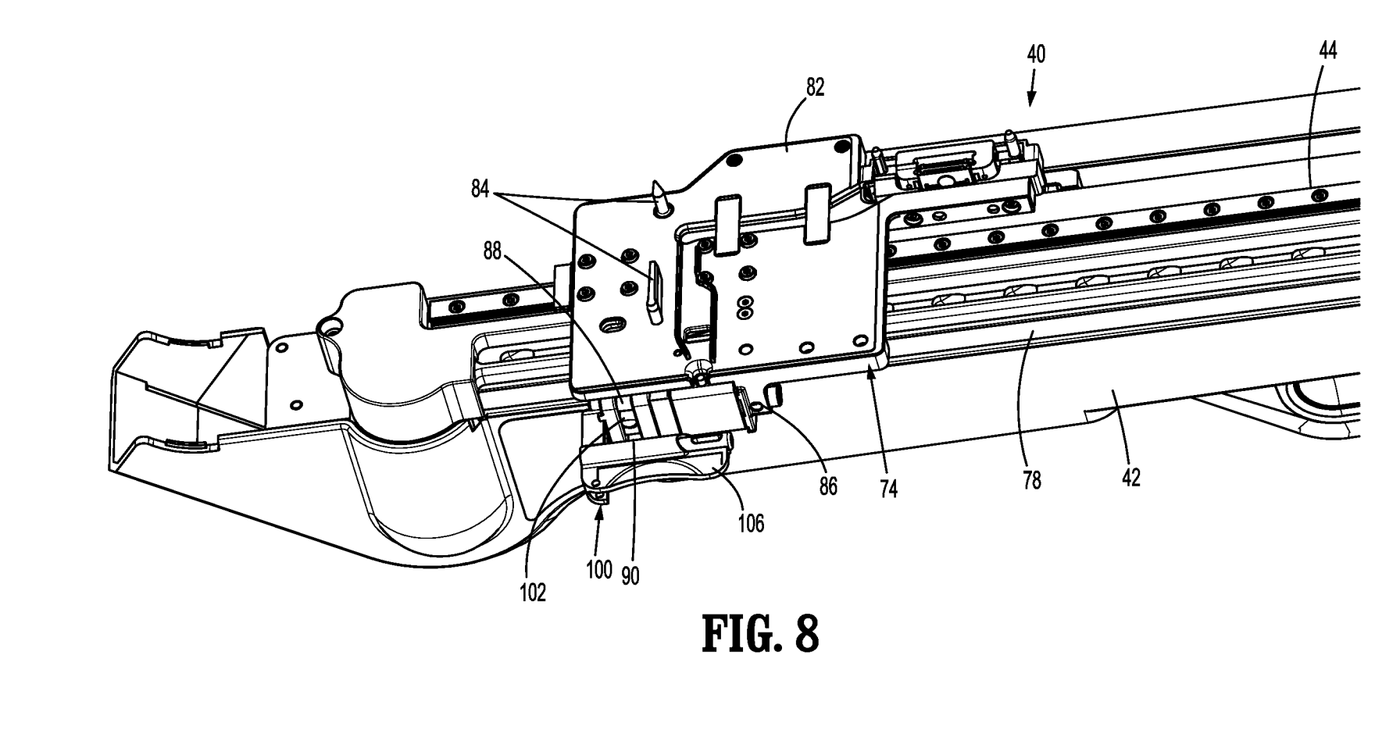
FIG. 8 is an enlarged, perspective view illustrating the release mechanism in a decoupled state from a carrier for the instrument drive unit.

With reference to FIGS. 8-10B, the carrier 74 further includes an appendage or tab 86 extending perpendicularly from a lateral side of the support plate 82. The appendage 86 supports a pair of rod-shaped locking members 88, 90. In aspects, the locking members 88, 90 may assume any suitable shape, such as, for example, rectangular. In aspects, more than two locking members may be provided. Each of the pair of locking members 88, 90 of the carrier 74 defines a cutout or recess 92a, 92b therein oriented towards one another and aligned with an axis "Y" (FIG. 10B) that extends transversely relative to the rotational axis "A" of the lever 106. The cutout 92a, 92b in each of the locking members 88, 90 of the carrier 74 has a cylindrical or concave configuration. In aspects, the cutouts 92a, 92b may have any suitable shape, such as, for example, a square, triangle, or circle. The locking members 88, 90 of the carrier 74 are configured to selectively engage a locking member 102 of a release mechanism 100 (FIG. 4).

The release mechanism 100 is fixed to the belt 78 of the drivetrain 72 and is configured to detachably connect the carrier 74 to the belt 78. The release mechanism 100 includes a clamp 104, a lever 106 pivotably coupled to the clamp 104, and the locking member 102. The clamp 104 may be configured as an L-shaped bracket that is fixed to the belt 78 via a frictional engagement or via a fastener, such that the release mechanism 100 travels with the belt 78. In aspects, the clamp 104 may have a pair of arms that capture the belt 78 therebetween.

The lever or handle 106 of the release mechanism 100 is pivotable relative to the clamp 104 about an axis "A" (FIG. 9A) to transition the release mechanism 100 between a first state, in which the release mechanism 100 fixedly couples the carrier 74 to the belt 78, and a second state, in which the release mechanism 100 decouples the carrier 74 from the belt 78 to allow for the manual translation of the carrier 74/instrument drive unit 70/surgical instrument 60 along the slide rail 40. In aspects, the release mechanism 100 may include a button 108 (FIG. 9A) that fixes the lever 106 in the first position. To allow the lever 106 to be pivoted relative to the clamp 104, the button 108 is first actuated to unlock the lever 106 from the clamp 104.

The locking member 102 of the release mechanism 100 may have a spherical shape and is configured to rotate about the axis "A" with the rotation of the lever 106. The locking member 102 of the release mechanism 100 is disposed between the pair of locking members 88, 90 of the carrier 74 and is selectively lockingly engaged thereto. The locking member 102 of the release mechanism 100 has a spherical outer surface defining a pair of cutouts 110a, 110b therein.

The cutouts 110*a*, 110*b* of the locking member 102 of the release mechanism 100 are circumferentially spaced 180 degrees from one another.

Figure 10A:
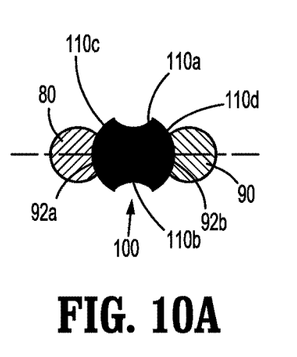
FIG. 10A is a transverse cross-sectional view illustrating a locking member of the release mechanism lockingly engaged with a pair of locking members of the carrier.

The spherical outer surface of the locking member 102 of the release mechanism 100 further includes first and second convex portions 110*c*, 110*d* circumferentially spaced 180 degrees from one another. The first and second convex portions 110*c*, 110*d* of the locking member 102 are configured for receipt in the respective cutouts 92*a*, 92*b* in the locking members 88, 90 of the carrier 74 when the release mechanism 100 is in the first state, as shown in FIG. 10A. The cutouts 92*a*, 92*b* in the respective first and second locking members 88, 90 of the carrier 74 permit the locking member 102 of the release mechanism 100 to rotate therewithin, in the direction indicated by arrow "B" in FIG. 10B, while resisting axial motion of the locking members 88, 90 of the carrier 100 relative to the locking member 102 of the release mechanism 100.

In some aspects, an electrical switch (not explicitly shown) may be integrated with the release mechanism 100. The electrical switch detects whether the lever 106 is in the first or second position and/or the proper mating of the carrier 74 with the release mechanism 100. Alternately, the electrical switch may be sensitive to the relative position of selected parts that are clamped to the drivetrain 72 in relation to parts moving with the carrier 74.

With reference to FIGS. 5 and 11A-12C, the carrier 74 further includes a spring element 200 that prevents the carrier 74 from moving distally towards the patient while the release mechanism 100 is in the second state (e.g., when the carrier 100 is freely translatable relative to the slide rail 40). The spring element 200 may be a leaf spring or any other suitable elongated biasing member and has a proximal end 200*a* and a distal end 200*b*. The proximal end 200*a* of the spring element 200 is attached to the plate 82 of the carrier 74 and is movable therewith. The spring element 200 is resiliently biased towards a bent state (FIGS. 11B and 12B) in which the distal end 200*b* thereof is engaged with a platform 206 of the slide rail 40. The distal end 200*b* of the spring element 200 is supported on a support surface 212 of the clamp 104 of the release mechanism 100 to maintain the spring element 200 in a preset or first position (FIGS. 11A and 12A), in which the distal end 200*b* of the spring element 200 is spaced from the platform 206 of the slide rail 40. The distal end 200*b* of the spring element 200 may have a protuberance, such as, for example, a rivet 208 configured for receipt in one of a plurality of notches 210 defined in the platform 206.

The notches 210 are longitudinally spaced from one another along the length of the slide rail 40 and are disposed underneath the spring element 200 of the carrier 74. Each of the notches 210 is configured to resist distal movement of the spring element 200 relative to the slide rail 40 when the release mechanism 100 is in the second state. Each of the notches 210 is defined by a proximally-facing wall 210*a* of the platform 206 and a ramped surface 210*b* of the platform 206. The ramped surface 210*b* extends from the proximally-facing wall 210*a* and is sloped upwardly in a proximal direction. The proximally-facing wall 210*a* is configured to engage the rivet 208 of the spring element 200 to prevent the spring element 200 and the carrier 74 from moving distally after the release mechanism 100 moves to the second state.

Figure 9A:
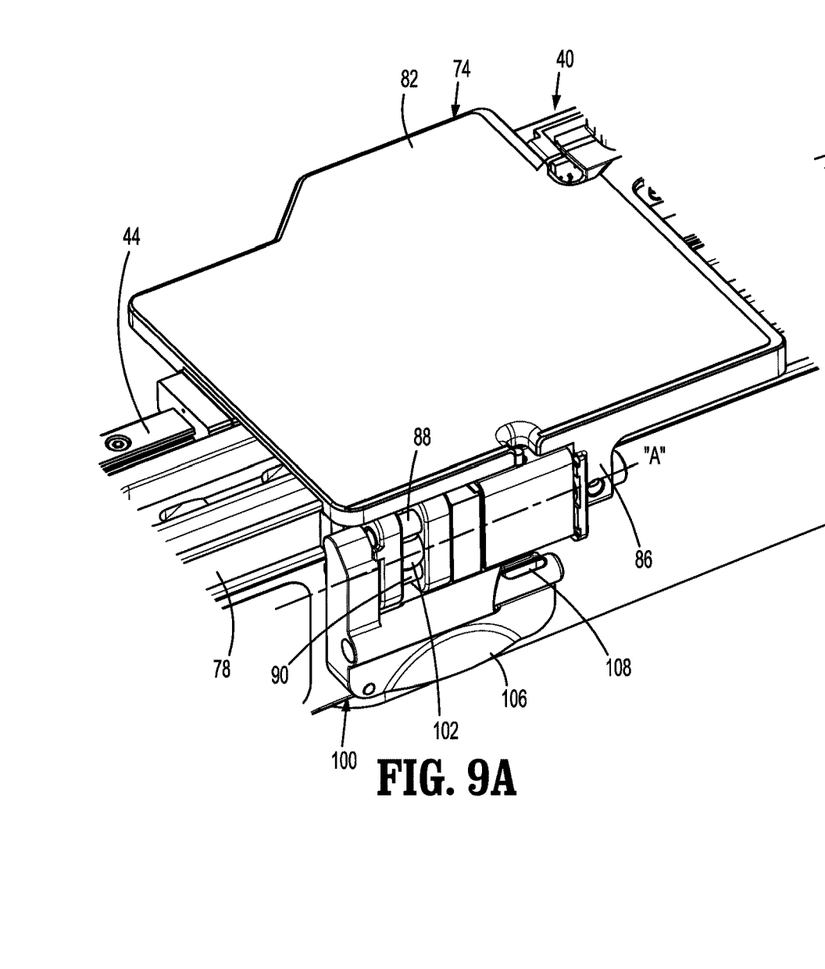
FIG. 9A is an enlarged, perspective view illustrating the release mechanism in a coupled state with the carrier.
Figure 9B:
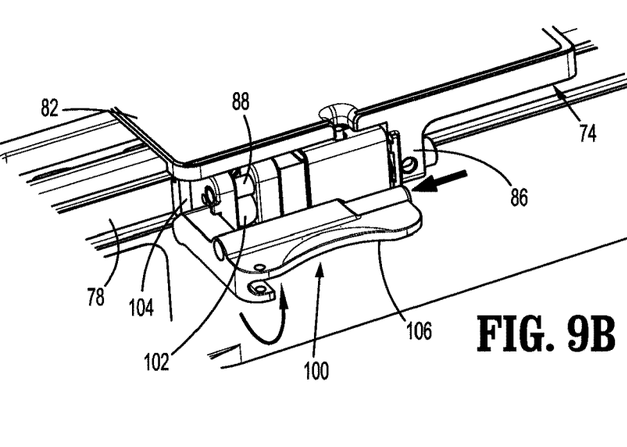
FIG. 9B is an enlarged, perspective view illustrating the release mechanism in a decoupled state from the carrier.
Figure 9C:
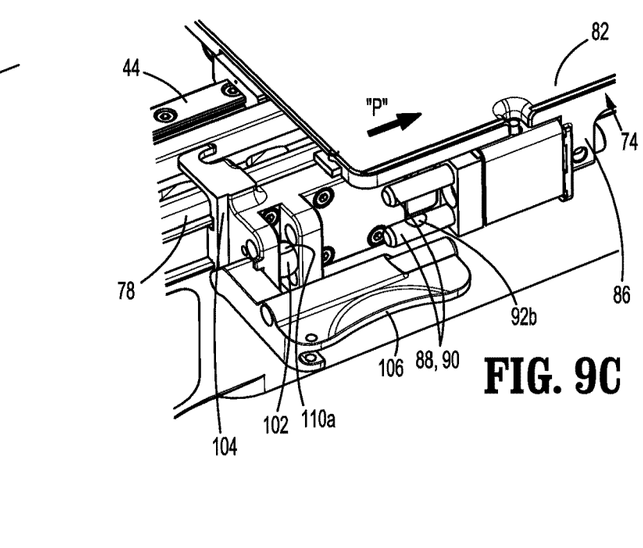
FIG. 9C is an enlarged, perspective view illustrating the carrier axially spaced from the release mechanism.

With reference to FIGS. 9A-9C, in an emergency situation, such as when there is an electrical power failure or if a motor (e.g., motor(s) 1 . . . n) should cease, and when the electromechanical surgical instrument 60 is at least partially positioned within a patient, a manual removal of the electromechanical surgical instrument 60 from within the patient may be achieved utilizing the release mechanism 100 of the present disclosure.

Figure 10B:
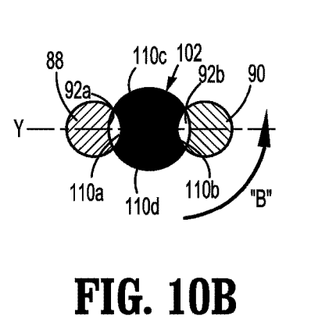
FIG. 10B is a transverse cross-sectional view illustrating the locking member of the release mechanism unlocked from the pair of locking members of the carrier.

In order to accomplish the manual removal of the electromechanical surgical instrument 60 from within the patient, the button 108 (FIG. 9A) of the release mechanism 100 is depressed to unlock the lever 106 from the clamp 104. The lever 106 is manually rotated relative to the clamp 104 about the rotational axis "A" from the first state (FIG. 9A) to the second state (FIG. 9B). As the lever 106 is rotated toward the second state, the locking member 102 of the release mechanism 100 is also rotated from a first state (FIG. 10A) to a second state (FIG. 10B).

When the locking member 102 is in the first state, the first and second convex portions 110*c*, 110*d* of the locking member 102 of the release mechanism 100 are received in the cutouts 92*a*, 92*b* of the respective first and second locking members 88, 90 of the carrier 74, such that relative axial motion between the carrier 74 and the release mechanism 100 is prevented. In this way, an actuation of the drivetrain 72 results in a translation of the carrier 74 along the slide rail 40. As best shown in FIG. 10B, as the lever 106 of the release mechanism 100 is rotated toward the second state, the first and second convex portions 110*c*, 110*d* of the locking member 102 of the release mechanism 100 move out of the cutouts 92*a*, 92*b* of the locking members 88, 90 of the carrier 74, whereby the cutouts 110*a*, 110*b* of the locking member 102 of the release mechanism 100 face the respective cutouts 92*a*, 92*b* of the first and second locking members 88, 90 of the carrier 74.

With the first and second convex portions 110*c*, 110*d* of the locking member 102 of the release mechanism 100 no longer received in the cutouts 92*a*, 92*b* of the locking members 88, 90 of the carrier 74, the carrier 74 is now free to translate relative to the release mechanism 100 and, more importantly, relative to the drivetrain 72 of the slide rail 40. Since the carrier is decoupled from the drivetrain 72, the instrument drive unit 70 (FIGS. 2 and 3) may be grasped by the clinician and translated, in the direction indicated by arrow "P" in FIG. 9C, relative to the slide rail 40 and the release mechanism 100 to withdraw the surgical instrument 60 from the operative site.

Figures 11A, 11B:
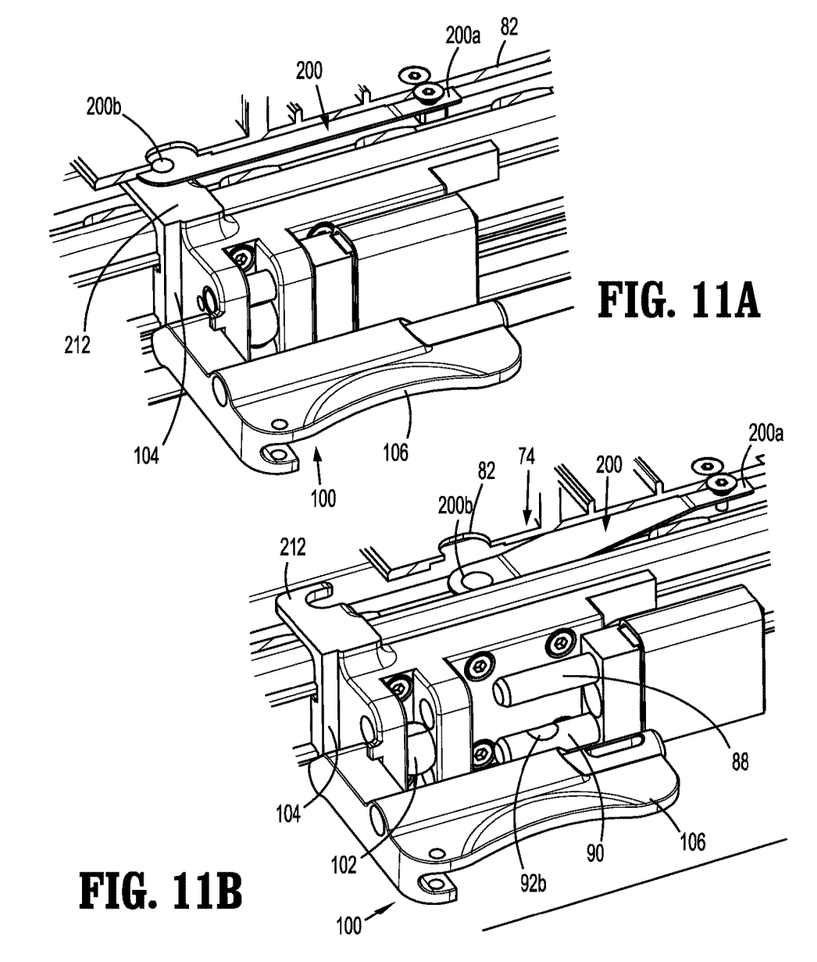
FIG. 11A is an enlarged, perspective view illustrating a spring element of the carrier in a preset position.
FIG. 11B is an enlarged, perspective view illustrating the spring element of the carrier in an activated position and engaged with the slide rail.

With reference to FIGS. 11A-12C, upon moving the carrier 74 proximally and away from the release mechanism 100, the distal end 200*b* of the spring element 200 becomes separated from the support surface 212 of the clamp 104 of the release mechanism 100, as shown in FIG. 11B. With the distal end 200*b* of the spring element 200 no longer being supported by the release mechanism 100, the resilient bias of the spring element 200 is allowed to pivot or flex the distal end 200*b* of the spring element 200 toward and into engagement with the platform 206 of the slide rail 40. In this state, when the clinician is moving the carrier by hand in the proximal direction for a distance less than or equal to the distance between the notches 210, the rivet 208 of the spring element 200 will be received in one of the notches 210 in the platform 206. The rivet 208 of the spring element 200 engages the proximally-facing wall 210*a* of the notch 210, which prevents any further inadvertent distal movement of the carrier 74 relative to the slide rail 40.

Figure 12A:
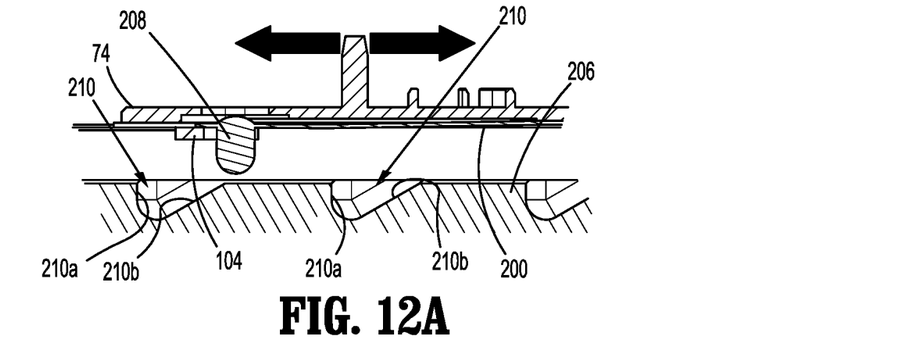
FIG. 12A is a longitudinal cross-sectional view illustrating the spring element in the preset position.
Figure 12B:
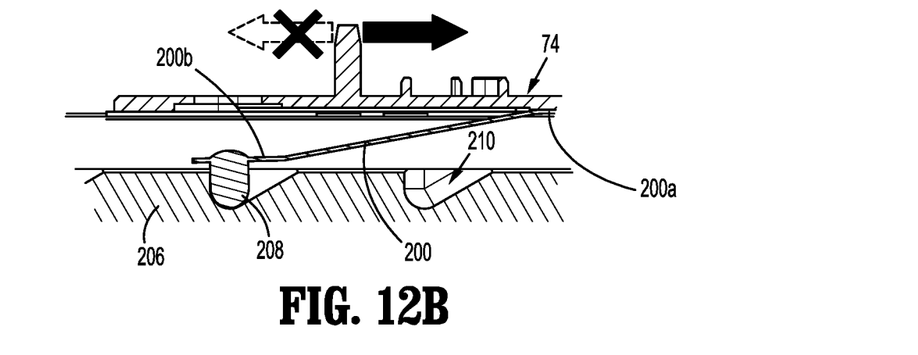
FIG. 12B is a longitudinal cross-sectional view illustrating the spring element engaged with a notch defined in the slide rail.
Figure 12C:
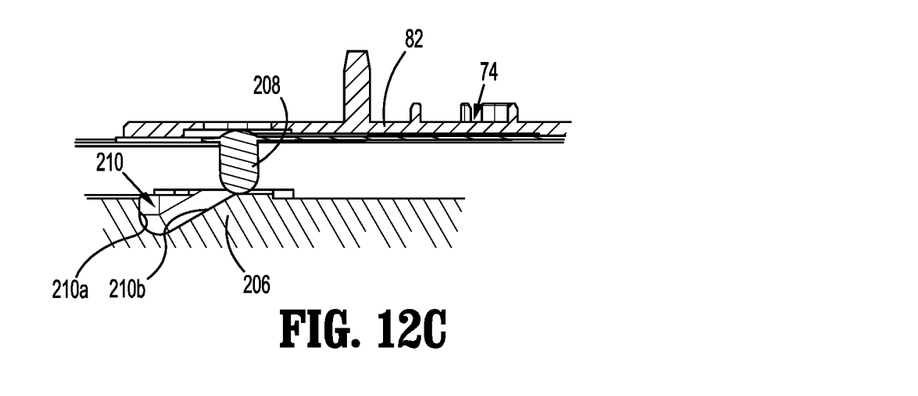
FIG. 12C is a longitudinal cross-sectional view illustrating the spring element re-repositioned in the preset position after the carrier is moved to a proximal position relative to the slide rail.

As shown in FIG. 12C, upon manually moving the carrier 74 to a proximal-most position on the slide rail 40, the rivet 208 of the spring element 200 rides up the ramped surface 210*b* of the proximal-most notch 210. The release mechanism 100 is also moved to the proximal-most position to re-engage the distal end 200*b* of the spring element 200 with the support surface 212 (FIGS. 11A, 11B) of the clamp 104 of the release mechanism 100. It is contemplated that the ramped surface 210b of the proximal-most notch 210 may extend higher than the other ramped surfaces. The lever 106 of the release mechanism 100 may be pivoted back to the first position to re-attach the carrier 74 to the belt 78.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the disclosure, and that such modifications and variations are also included within the scope of the disclosure. Accordingly, the subject matter of the disclosure is not limited by what has been particularly shown and described.

The invention claimed is:

1. A robotic surgical system, comprising:
   a slide rail configured to be coupled to a robotic arm, the slide rail defining a longitudinal axis;
   a drive member movably coupled to the slide rail;
   a carrier coupled to the slide rail and configured to slide along the longitudinal axis of the slide rail in response to movement of the drive member; and
   a release mechanism fixed to the drive member, such that the release mechanism moves with the drive member relative to the slide rail, wherein the release mechanism is configured to have a first state, in which the release mechanism couples the carrier to the drive member, and a second state, in which the release mechanism decouples the carrier from the drive member, such that the carrier is manually movable relative to the drive member, wherein the release mechanism includes:
      a clamp fixed to the drive member; and
      a lever coupled to the clamp and configured to rotate relative to the clamp to selectively couple and decouple the release mechanism to and from the carrier.

2. The robotic surgical system according to claim 1, wherein the carrier has a locking member, and the release mechanism has a locking member attached to the lever and configured to rotate with the lever and relative to the locking member of the carrier to selectively lockingly engage with the locking member of the carrier.

3. The robotic surgical system according to claim 2, wherein the locking member of the carrier defines a cutout therein, the locking member of the release mechanism engaging the cutout of the locking member of the carrier when the release mechanism is in the first state to transmit axial motion between the carrier and the release mechanism.

4. The robotic surgical system according to claim 3, wherein the cutout of the locking member of the carrier permits the locking member of the release mechanism to rotate therewithin and resists axial motion of the locking member of the release mechanism relative to the locking member of the carrier.

5. The robotic surgical system according to claim 4, wherein the cutout of the locking member of the carrier has a cylindrical configuration and extends transversely relative to the longitudinal axis of the slide rail.

6. The robotic surgical system according to claim 3, wherein the locking member of the release mechanism defines a cutout configured to be radially offset from the cutout of the locking member of the carrier when the release mechanism is in the first state, and to face the cutout of the locking member of the carrier when the release mechanism is in the second state.

7. The robotic surgical system according to claim 3, wherein the locking member of the release mechanism has a convex portion configured for receipt in the cutout of the locking member of the release mechanism when the release mechanism is in the first state.

8. The robotic surgical system according to claim 7, wherein the locking member of the carrier is rod-shaped, and the locking member of the release mechanism is spherically-shaped.

9. The robotic surgical system according to claim 1, further comprising a spring element attached to the carrier and movable therewith, the slide rail defining a plurality of notches longitudinally spaced from one another along the longitudinal axis of the slide rail, wherein the plurality of notches is configured to resist distal movement of the spring element relative to the slide rail when the release mechanism is in the second state.

10. The robotic surgical system according to claim 9, wherein the spring element is configured to move from a first position, in which the spring element is disengaged from the slide rail, to a second position, in which the spring element is engaged with the slide rail.

11. The robotic surgical system according to claim 10, wherein the spring element has a proximal end secured to the carrier, and a distal end resiliently biased in a direction toward the slide rail.

12. The robotic surgical system according to claim 11, wherein the distal end of the spring element is supported by the release mechanism to maintain the spring element in the first position, the distal end of the spring element being configured to pivot into engagement with the slide rail upon the carrier moving proximally relative to the release mechanism.

13. The robotic surgical system according to claim 9, wherein each notch of the plurality of notches is defined by a proximally-facing wall and a ramped surface extending proximally from the proximally-facing wall, the proximally-facing wall configured to prevent the spring element and the carrier from moving distally after the release mechanism moves to the second state.

14. A robotic surgical system, comprising:
   a carrier configured to slidingly couple to a slide rail of a robotic arm and to couple to an instrument drive unit; and
   a release mechanism configured to operably couple the carrier to the slide rail and including:
      a clamp configured to fix the release mechanism to a drive member of the slide rail; and
      a lever pivotably coupled to the clamp and configured to move between a first state, in which the carrier is fixed relative to the release mechanism, and a second state, in which the carrier is axially movable relative to the release mechanism, such that the carrier is manually movable relative to the slide rail.

15. The robotic surgical system according to claim 14, wherein the carrier has a locking member, and the release mechanism has a locking member attached to the lever and configured to rotate with the lever and relative to the locking member of the carrier to selectively lockingly engage with the locking member of the carrier.

16. The robotic surgical system according to claim 15, wherein the locking member of the carrier defines a cutout therein, and the locking member of the release mechanism engages the cutout of the locking member of the carrier when the release mechanism is in the first state to transmit axial motion between the carrier and the release mechanism.

17. The robotic surgical system according to claim 16, wherein the cutout of the locking member of the carrier permits the locking member of the release mechanism to rotate therewithin and resists axial motion of the locking member of the release mechanism relative to the locking member of the carrier.

\* \* \* \* \*